Sept. 29, 1970     D. R. BAINARD     3,531,168
SHAFT SEAL TRANSMITTING THRUST TO ROLLER BEARING
Filed Nov. 14, 1968
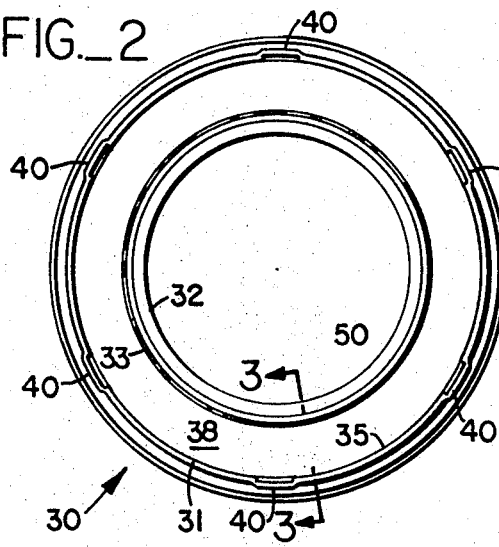
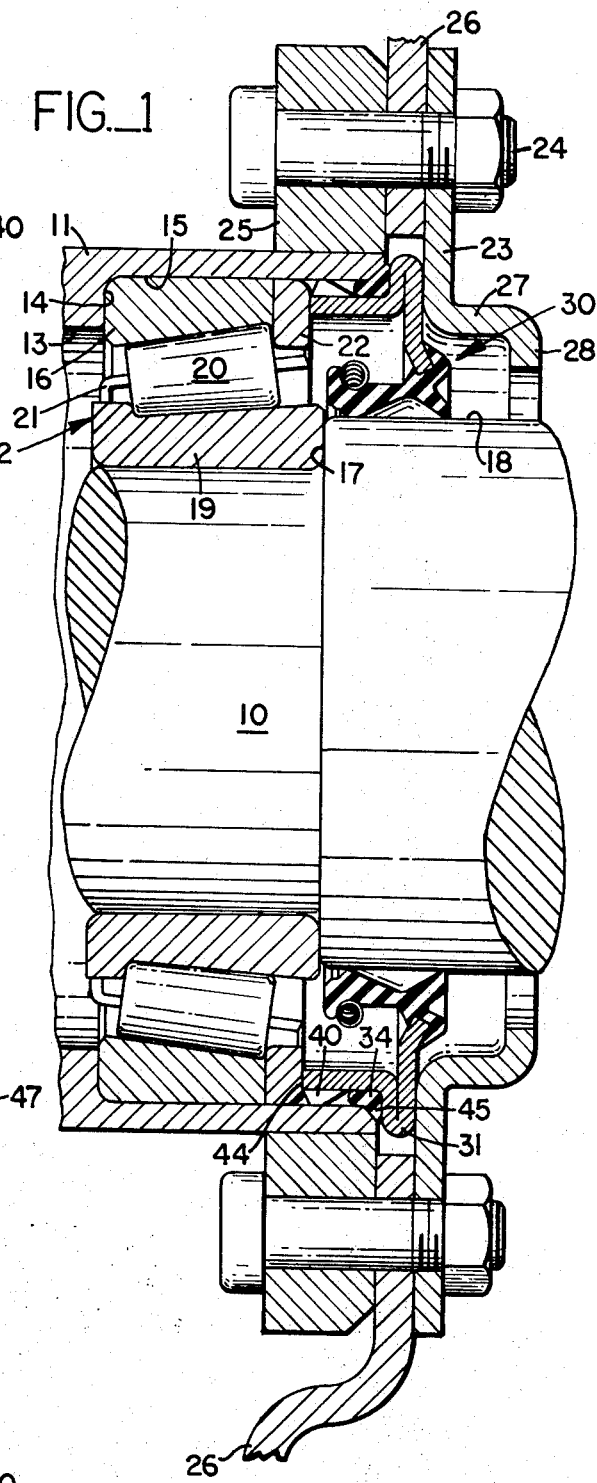
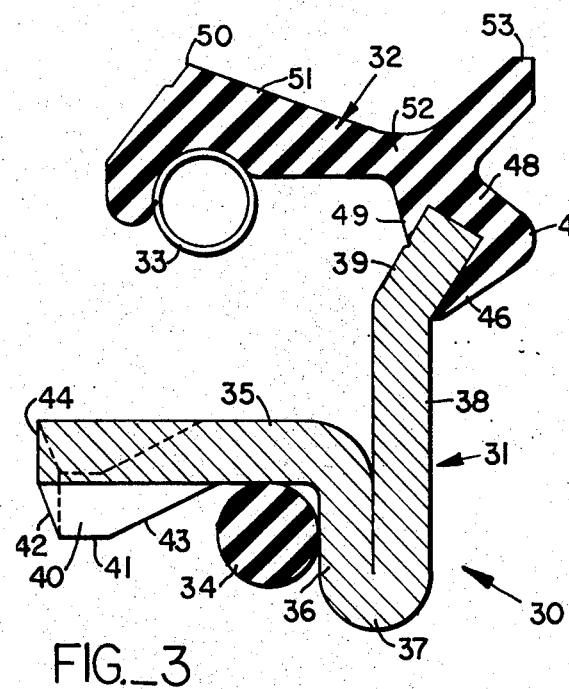
*INVENTOR.*
DEAN R. BAINARD
BY
Owen, Wickersham & Erickson
ATTORNEYS United States Patent Office 3,531,168
Patented Sept. 29, 1970

3,531,168
SHAFT SEAL TRANSMITTING THRUST TO ROLLER BEARING
Dean R. Bainard, Novi, Mich., assignor to Federal-Mogul Corporation, Southfield, Mich., a corporation of Michigan
Filed Nov. 14, 1968, Ser. No. 775,814
Int. Cl. F16c *33/78;* F16j *15/32*
U.S. Cl. 308—187.1                                   10 Claims

ABSTRACT OF THE DISCLOSURE

A seal unit for use with roller bearings between a stationary bore and a rotating housing where pressure against the outer race of the bearing is transmitted through the seal. The seal has a rigid metallic reinforcing member with a cylindrical portion having a radially flat free end with a plurality of a radially outwardly extending spacers for slip-fit bore contact, spacing the free end inside the bore. The opposite end of the cylindrical portion leads to a radially outwardly extending shoulder portion and from there a doubled-back portion leads to an inwardly extending radial flange. An elastomeric lip-type seal is supported by a radially inner peripheral portion of the radial flange. A separate O-ring gasket on the outer surface of the cylindrical portion abuts the shoulder and seals between the seal unit and the bore.

This invention relates to an improved seal of a radial shaft-sealing type which is also used to transmit thrust to the race of a roller bearing.

The changeover from ball bearings to roller bearings (generally tapered) in the rear axles of automotive vehicles has brought some interesting and difficult problems. Special types of roller bearings have been designed to withstand the forces involved, and these have required a change in the shaft sealing means that must be used outside the roller bearings to prevent leakage of oil. The outer race of this new type of roller bearing makes a slip fit in the axle tube or housing, and an axial load has to be applied to the bearing's outer race in order to clamp the bearing in place. In this invention, the load is preferably obtained by deflecting a hard retainer plate, and the load is transmitted from the retainer plate to the bearing's outer race through the case of the shaft seal. As a result, the seal unit becomes a structural member of the rear axle assembly.

In order to transmit the load properly, the seal case of this invention makes a slip fit with the axle tube and at the same time the case lies radially inboard of the axle tube far enough to offer full support to the bearing, for transmission of the force from the retainer plate to the bearing. Since the case makes a slip fit in the axle tube instead of the press fit heretofore employed in most axle seals, it is important to provide means for sealing against leakage between the seal case and the axle tube that is capable of accepting the wide dimensional variation that tends to be caused by a piling up of the tolerances in the axle tube, the bearing retainer plate, and the other parts concerned. Also, it is important for the shaft seal itself to transmit sufficient pressure to the bearing at an effective location.

Of course, the seal must still perform its standard function of sealing against the leakage of oil between the stationary axle tube and the rotating axle. Also, since axial space is at a premium, the seal must do this in a distance compatible with its additional function of keeping the bearing properly loaded.

Briefly considered, the seal of the present invention incorporates a rigid metallic case or reinforcing member having a generally cylindrical portion which is used both for slip-fit engagement of the bore and for the transmission of the thrust from the retainer plate to the outer race of the bearing. The outer periphery of the generally cylindrical portion is spaced well within the bore except for a plurality of radially outwardly extending spacer projections adjacent to the free end, which provide the slip fit in the bore and serve to space the remainder of the case evenly away from the bore. The cylindrical portion can thus be located for optimum engagement of the thrust member with the outer race of the roller bearing. The cylindrical portion terminates, at the extremity opposite the free end, in a shoulder where the cylindrical portion meets a radial portion. The shoulder is formed by a double thickness of the radial flange at that point, and against this shoulder is an O-ring which is able to engage the end of the axle tube wall and serve as a gasket between that wall and the seal case, preventing any leakage of oil there.

Another novel feature of the invention is the particular support offered by the radial flange for the elastomeric rotary shaft sealing member. The flash-eliminating re-formed metal anchor is basically like that covered in U.S. Pats. Nos. 3,004,298 and 3,010,748 of Robert N. Haynie, but the inclination of the frustoconical anchor portion is *opposite* to that normally encountered, in order to conserve axial space at the cylindrical portion of the case and still get adequate length at the elastomeric seal portion.

Other objects and advantages of the invention will appear from the following description of the preferred form thereof.

In the drawings:

FIG. 1 is a fragmentary view in side elevation and in section of a rear axle installation involving the principles of the invention.

FIG. 2 is a view in end elevation of a seal unit embodying the principles of the invention and employed in the combination of FIG. 1.

FIG. 3 is an enlarged fragmentary view in section taken along the line 3—3 in FIG. 2.

As FIG. 1 shows, the installation calls for an axle 10 which extends inside an axle tube 11 and which is separated from the axle tube 11 by a tapered roller bearing 12. (A non-tapered roller bearing may, where desired, be substituted.) The axle tube 11 is provided with an inner bore 13 which is stepped at a shoulder 14 to a wider outer bore 15. The shoulder 14 provides a seat for the outer race 16 of the roller bearing 12. The axle 10 also has a shoulder 17 stepped outwardly to a contour portion 18, to provide a seat for the inner pace or cone 19 of the roller bearing 12. Between this cone 19 and the outer race 16 are the tapered rollers 20, spaced by a cage 21. The roller bearing 12 shown is an improved design, having a guard and thrust ring 22 which extends radially inwardly at the outer end of the rollers 20 and is permanently affixed to the outer race 16, helping to limit their axial movement and unitizing the bearing assembly into a single, complete package for ease of handling during storage and installation. To assure that the bearing works properly, thrust must be exerted against the thrust ring 22, and this thrust is provided by a hardened retainer plate 23 which is secured by a bolt 24 to a heavy flange 25 that is welded to the axle tube 11, with a brake backing plate 26 therebetween. The plate 23 may be stepped outwardly by an axial portion 27 to provide a suitable seal guard 28. The plate 23 bears against a seal unit 30 of this invention which, in addition to performing its usual shaft-sealing function, has to transmit the thrust from the plate 23 to the ring 22.

The novel seal unit 30 of this invention preferably comprises four main elements: a metal case 31, an elastomeric sealing member 32, a lip-pressure exerting spring 33, and a sealing O-ring gasket 34. The metal case 31 is preferably made from sheet metal and has a cylindrical portion 35 leading to an outwardly extending radial portion 36 which is recurved immediately, or shot-gunned, at a radially outer extremity 37 into an inwardly extending radial flange 38 terminating at its inner end in a frustoconical anchor portion 39 to which the elastomeric member 32 is molded and bonded in accordance with the principles of U.S. Pats. 3,004,298 and 3,010,748.

The cylindrical portion 35 is appreciably smaller in diameter than the bore 15 of the axle tube 11; this is not usual practice for a shaft seal but it is important in this instance because of two things: first, the seal case 31 is to have a slip fit rather than a tight press fit in the bore 15. Second, the thrust pressure is brought to bear on the thrust ring 22 at a centered location. By having this thrust spaced radially inwardly from the bore 15, the pressure is brought against the thrust ring 22 inside of its edge bevel, for if the case 31 were to fit snugly against the bore 15, its contact with the ring 22 would be a sharp line contact along the cone of the bevel. But in this invention, due to the inward spacing, the full flat edge 44 contacts the radial wall of the thrust ring 22.

In order to provide the slip fit, a series of radially outwardly extending projections 40 is provided. A preferred shape for these projections 40 is shown in the drawings, but other shapes are possible. The preferred shape may be made by a type of dinking or forming action by which the projections 40 are stretched out from the main cylindrical portion 35 to form at each projection 40 a short accurate land 41 for engagement or near engagement of the bore 15; preferably there is a small clearance between the lands 41 and the bore 15, e.g., about 0.002 inch on the diameter, enabling the desired insertion and alignment. Each projection 40 preferably has a chamfered or beveled edge 42 assisting in installation and a reinforcing trailing angle 43 that aids retention of the O-ring 34 during handling and installation. The free edge 44 of the case is quite flat.

It is important, of course, to avoid leakage between the case 31 of the shaft seal 30 and the bore 15 of the axle tube 11. The shotgunning of the case 31 provides a radially outward shoulder 36, 38 of double thickness, against which the end wall 45 of the axle tube 11 compresses the gasket 34, which may be a simple O ring, but which is preferably made from elastomer especially compounded for superior gasketing. This is usually a different elastomer from that from which rotating shaft seals are made, so that the elastomer of the gasket 34 is of a different composition from that of the elastomeric portion 32. The shoulder 36 thus retains the O ring 34 and helps to provide means for obtaining maximum thrust force properly directed from the retainer 23 to the thrust ring 22, and the double thickness portion 36, 38 provides a spacious bearing surface for the retainer 23. The double thickness wall 36, 38 is still somewhat thinner than the brake plate 26, and the cylindrical portion 35 is long enough to locate the shoulder 36 outside the axle tube 11 where the free end 44 bears against the thrust ring 22.

The retaining member 23 bears against the outer face of the radial flange 38 and sends its force through it and the shoulder 36 and through the cylindrical portion 35 to the thrust member 22. The radial flange 38, however, also serves the purpose of also supporting the elastomeric sealing element 32. It does this in an unusual manner, inasmuch as its inner peripheral portion 39 is bent initially outwardly during molding of the elastomeric member 32; in other words the anchor portion 39 is bent in the opposite way from the usual, to give approximately a thirty-degree axially outward inclination. This gives a firm anchor to the elastomeric sealing member 32 while also serving to help eliminate flash in the molding operation.

The elastomeric element 32 is preferably provided with an anchor portion 46 substantially as shown, leading off from the axially outward side of the frustoconical anchor 39 at approximately twenty-five degrees to form a bumper portion 47 and then tapered in toward another anchor portion 48 on the opposite side of the anchor member 39. The main (or oil-sealing) lip 50 is on a body portion 51 connected to the anchor portions 46, 48, and 49 by a flexing neck 52. On the opposite side of the neck 52 is an auxiliary or dust-sealing lip 53 which extends out away from the main sealing lip 50 and is used for excluding foreign material, while the garter spring 33 is preferably mounted on the opposite side of the body 51 from the lip 50 and is used to force the lip 50 snugly against the axle 10, to retain contact.

In installation, the seal unit 30 and the roller bearing 12 are usually placed on the axle 10, and when the axle 10 is installed, the bearing 12 engages by slip fit the axle tube 11, the axle 10 being moved until the bearing 12 engages the shoulder 14. The thrust ring 22 is already in place on the bearing 12. Then the seal unit 30 is secured in place by the retainer ring 23, which then sends its thrust through the seal case 31 to the thrust ring 22 and thence to the outer race 16 of the roller bearing 12. At the same time, the gasket 34 is compressed between the end 45 of the axle tube 11 and the shoulder 36 and serves to make a tight seal at this point. The seal element 32 is used to make a fine rolling and rotating contact with the shaft, 10 with the oil retaining side of the lip 50 facing the roller bearing 12 and the dirt excluding lip 53 is on the opposite side. The retainer 23 constantly provides a guard 28 riding fairly close to the shaft 10 for deflecting rocks and other material therefrom. The lip 53 excludes such dirt as does get through the guard.

An advantage of this device is the O-ring 34 may be replaced without pressing the bearing 12 off from the shaft 10 and without replacing the entire seal unit 30. This becomes important during servicing, because if, for any reason, the axle shafts are removed from the vehicle, the O-ring 34 may not safely be reused. This invention makes it possible to take care of this by a simple replacement of the O-ring, without having to replace the entire seal assembly, as was heretofore necessary. The O-ring 34 need not, of course, actually be round; it may have a D shape or other non-round cross section.

Another advantage of the structure of the seal unit 30 is that it enables straight column loading of the cylindrical case portion 35, thereby reducing any bending movement on the case 31 and making it possible to use thinner material for the case 31 than would otherwise be required.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A rotary seal unit for use with roller bearings, including in combination:

a rigid metallic reinforcing member having a cylindrical portion with a radially flat free end and a plurality of radially outwardly extending spacer portions about its periphery adapted for slip-fit bore contact and clearance and for spacing said free end inside a bore, said reinforcing member having at the opposite end of said cylindrical portion a radially outwardly extending shoulder portion and an inwardly extending radial flange, elastomeric seal means supported by a radially inner peripheral portion of said radial flange, and a separate gasket on the outer surface of said cylindrical portion between said spacer portions and said shoulder portion and bearing against said shoulder portion.

2. The seal unit of claim 1 wherein said radial flange joins said shoulder portion at the outer extremity thereof and lies against it to give a double-thickness portion between said outer extremity and the diameter of the cylindrical portion.

3. The seal unit of claim 1 wherein said radially inner peripheral portion is frustoconical and inclines axially in the opposite direction from said cylindrical portion, wherein said elastomeric seal means has a sealing lip lying on the opposite side of said radial flange from said frustoconical portion.

4. The seal unit of claim 1 wherein said spacer portions are stretched-out formed portions of said cylindrical portion.

5. The seal unit of claim 1 wherein said spacer portions are somewhat inset from said flat free end and are joined thereto by chamfers.

6. The seal unit of claim 1 wherein said gasket is an elastomeric O-ring supported by but not attached to said reinforcing member.

7. An axle and bearing installation, including in combination:
an axle tube having a stepped bore providing a shoulder,
an axle having a stepped outer periphery providing a shoulder between an inner portion and an outer portion,
a roller bearing having a cone abutting against said axle shoulder and an outer race abutting against said bore shoulder,
a retainer member secured outside said axle tube, and
a seal unit for sealing against leakage of oil between said axle and said axle tube and for carrying thrust from said retainer member to said outer race, said seal unit comprising,
a rigid metallic case having a cylindrical portion with a radially flat free end bearing against said roller bearing and transmitting thrust to the outer race thereof, said cylindrical portion having a plurality of radially outwardly extending spacer portions about it periphery providing slip-fit bore contact or clearance and spacing said free end inside said bore, said case having at the opposite end of said cylindrical portion a radially outwardly extending shoulder portion and an inwardly extending radial flange,
elastomeric seal means supported by a radially inner peripheral portion of said radial flange and engaging said axle outer portion, and
a separate gasket on the outer surface of said cylindrical portion between said spacer portions and said shoulder portion and compressed between said shoulder portion and said axle tube by said retainer member.

8. The installation of claim 7 wherein said radial flange and said shoulder portion join at an outer extremity and are abutted together to give a double-thickness portion and said retainer member bears against said double thickness portion.

9. The installation of claim 7 wherein said spacer portions are joined by chamfers to said free end.

10. The installation of claim 7 wherein said gasket is an elastomeric O-ring.

References Cited

UNITED STATES PATENTS

| | | | |
|---|---|---|---|
| 2,834,616 | 5/1958 | Gebert et al. | 308—187.1 XR |
| 2,871,037 | 1/1959 | Johnson et al. | 277—153 |
| 2,992,027 | 7/1961 | Wright et al. | 277—153 XR |
| 3,306,683 | 2/1967 | Deuring | 277—153 XR |

MARTIN P. SCHWADRON, Primary Examiner

U.S. Cl. X.R.

277—37, 153, 187